United States Patent [19]
Hoyt

[11] Patent Number: 4,732,299
[45] Date of Patent: Mar. 22, 1988

[54] COLLAPSIBLE CONTAINER

[76] Inventor: Earl E. Hoyt, 210 Chickasaw Trail, Franklin Lakes, N.J. 07417

[21] Appl. No.: 827,627

[22] Filed: Feb. 10, 1986

[51] Int. Cl.⁴ ............................................. B65D 35/22
[52] U.S. Cl. ..................................... 222/94; 222/107; 222/143; 493/213
[58] Field of Search ................... 383/80, 96, 37, 906; 493/213, 929, 962; 222/92, 94, 105, 107, 129, 135–136, 143, 145, 153, 478, 482

[56] References Cited

U.S. PATENT DOCUMENTS

| | | | |
|---|---|---|---|
| 2,517,027 | 8/1950 | Rado | 22/94 |
| 3,011,293 | 12/1961 | Rado | 493/213 X |
| 3,740,306 | 6/1973 | Kosbab et al. | 222/107 X |
| 4,078,699 | 3/1978 | Soto | 222/89 |
| 4,280,498 | 7/1981 | Jensen | 251/310 X |
| 4,528,180 | 7/1985 | Schaeffer | 222/94 X |
| 4,559,053 | 12/1985 | Porges | 604/408 |

FOREIGN PATENT DOCUMENTS 3119179 12/1982 Fed. Rep. of Germany ...... 383/906

*Primary Examiner*—Michael S. Huppert
*Attorney, Agent, or Firm*—W. Patrick Quast

[57] ABSTRACT

A collapsible container which has a first pliable member and a second non-pliable member, wherein the first pliable member includes a first pliable sheet and a second pliable sheet which are joined together to form a pouch to hold the contents. The second non-pliable member includes a base design allowing for leak-free seals with the pliable sheets and a stem having a passageway with an outlet for dispensing the contents of the pouch. A process and an apparatus of container manufacture is also provided.

6 Claims, 20 Drawing Figures

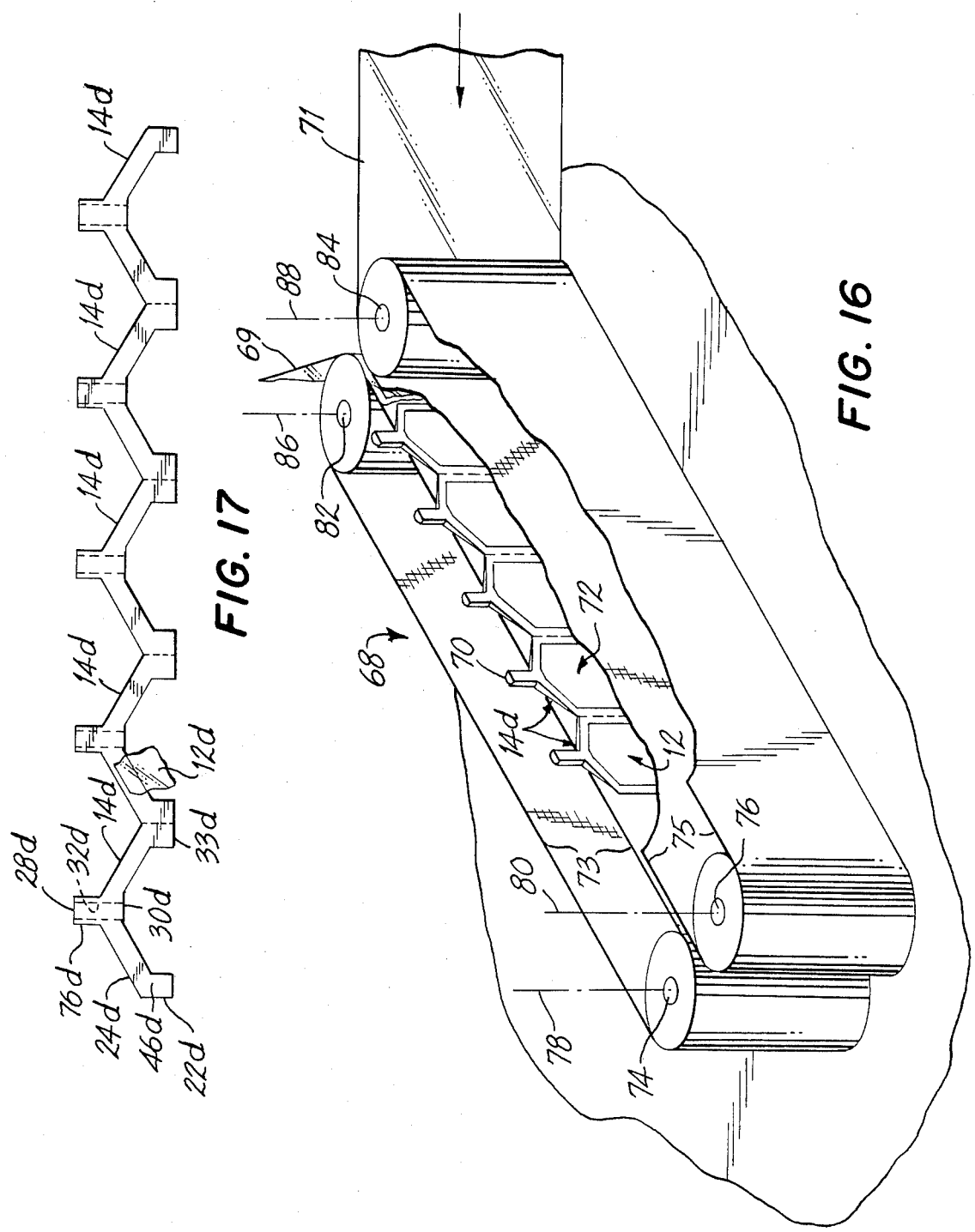

4,732,299

COLLAPSIBLE CONTAINER

FIELD OF THE INVENTION

The present invention relates to a collapsible container for selected contents, which is provided with an outlet to expel a portion of the contents by applying pressure on the container wall.

BACKGROUND OF THE INVENTION

A prior art collapsible container is shown and described in U.S. Pat. No. 2,517,027. Such prior art container has a tube, which has a first welded end portion, and which has a special welded end portion having a neck with at least one self-closing aperture. The tube is made of a pliable elastic non-metallic material.

One problem with the prior art container is that the pliable neck portion is not adapted for use where a rigid neck portion and outlet are required, in particular, for connecting the outlet to a rigid cap portion, or for connecting the outlet to an inlet of a sub-assembly of a machine.

Yet another prior art container including a tube of pliable film material and having a relatively non-pliable outlet portion is shown in the drawings as prior art. In this prior art embodiment, and labeled FIG. 20, there is an abrupt change in the direction of the pliable film material where it meets the outlet portion. This abrupt change makes it difficult to seal the film at this juncture. The sealing step must be done with relative care, thus slowing the process down. Notwithstanding, there is still a relatively high number of rejects initially; and enumerable "leakers" after shipping. Also because of the relatively unsightly appearance of the prior art container depicted, marketing areas are limited particularly in the field of consumer products.

The above-mentioned problems of the prior art containers are overcome by using a two-piece container, which has a first pliable container portion for storing the contents, and which has a second rigid container portion having a rigid neck portion with a rigid stem with an outlet for dispensing the contents.

Further the two piece container includes a second rigid container portion which is appropriately contoured without abrupt surface changes so that there is a smooth, uninterrupted seal between the first pliable portion and the rigid container portion. Thus the number of rejects is minimal, with almost non-existent leaking subsequently. Also the container presents a more handsome appearance improving appeal in the consumer home product field.

SUMMARY OF THE INVENTION

In accordance with the present invention, there is provided a collapsible container comprising a first pliable member and a second non-pliable member, wherein said first pliable member includes a first pliable sheet and a second pliable sheet, which are joined together to form a variable volume cavity therebetween, and said second non-pliable member includes a base portion having opposite surfaces of improved design respectively connecting to said first pliable sheet and to said second pliable sheet in a leak free manner, a tapered portion connecting to the base portion, and a stem portion connecting to the tapered portion, and wherein said stem portion has an opening for dispensing the contents of the container, and said base portion has an opening for receiving the contents of the cavity, and said second non-pliable member has a passageway connecting the stem opening to the base opening.

The opposite surfaces of the base portion feather down at each edge thus ensuring a smooth uninterrupted sealing of the pliable sheets or film to and along the base portion surfaces.

The above-mentioned objects and advantages of the present invention will be more clearly understood when considered in conjunction with the accompanying drawings.

BRIEF DESCRIPTION OF THE DRAWINGS

The invention will be better understood if you consider the following description taken together with the accompanying drawings in which:

FIG. 16 is a perspective view of a second embodiment of an apparatus of manufacture of the container of the present invention.

FIG. 17 is an elevation view of a portion of the apparatus shown in FIG. 16.

DESCRIPTION OF THE PREFERRED EMBODIMENT

Figure 1:
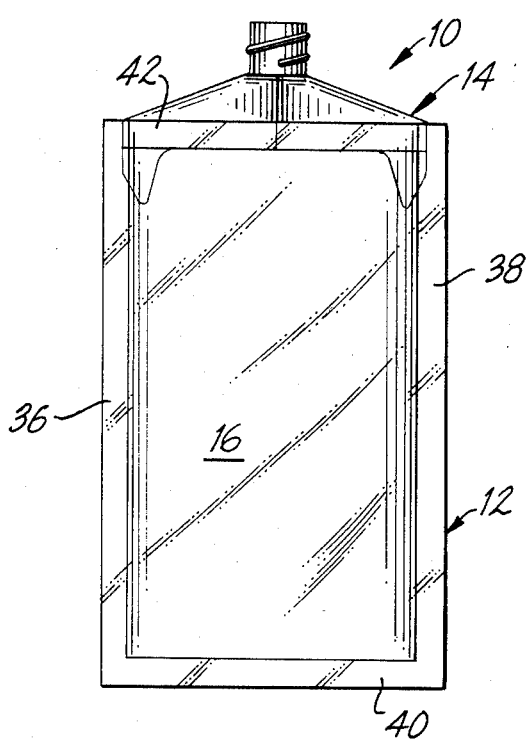
FIG. 1 is an elevation view of a container according to the present invention.

In FIG. 1, a container according to the present invention is provided. Container 10 includes:

a first lower portion 12, which is a pliable member, and a second upper portion 14, which is a non-pliable member.

Lower portion 12 has:

a first wall, sheet or film 16, and a second wall, sheet or film 18, which form a cavity 20 therebetween.

Sheets 16, 18, which are made of a pliable, filmlike material, can be pressed toward each other or away from each other so that cavity 20 has a variable volume, for filling the cavity 20 with its contents and for extruding the contents from its upper portion 14.

In one prototype of container 10, sheet 16 has a width of six inches and a height of nine and a half inches. Sheet 18 has a similar size. Sheets 16 and 18 are in substantially parallel planes, prior to filling the container 10.

Sheets 16, 18 are made of a pliable, film-like plastic, foil, paper or any laminated or coextruded material. Upper portion or insert 14 is made of a non-pliable, rigid material which is a compatible material suitable for sealing to the pliable sheets.

Figure 2:
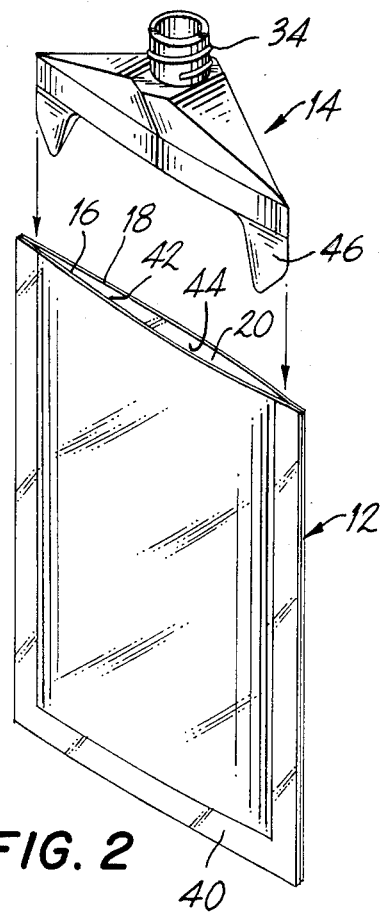
FIG. 2 is a perspective view of the container of FIG. 1.

Upper portion 14 has:
a base portion 22,
a tapered portion 24, and
a stem portion 26, which has a top opening 28.
Base 22 has:
a bottom opening 30. Upper portion 14 has a passageway 32, which connects bottom opening 30 to top opening 28.
Stem 26 has:
a thread 34 for threading a cap (not shown) on to stem 26, as shown in FIG. 2. This, of course, can be a non-threaded, snap fit connection.
Base 22 also has:
cantilever portions 31, 33, for ease of assembly of lower portion 12 to upper portion 14 and for support of lower portion 12 from upper portion 14. Cantilever portions 31, 33 are self aligning lugs, which help locate upper portion 14 into proper position within cavity 20 of container 10 before final seal of joint portions 42, 44 to upper portion 14.

Figures 3, 6:
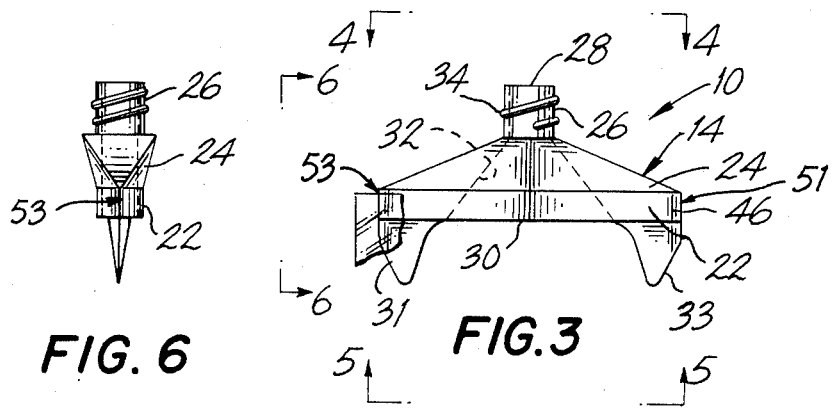
FIG. 3 is an elevation view of an upper portion of the container of FIG. 1.
FIG. 6 is an elevation view along line 6—6 of FIG. 3.

As shown in FIGS. 1 and 2, the sheets 16 and 18 are joined together. Sheet 16 has a left edge joint portion 36, a right edge joint portion 38, and a bottom edge joint portion 40. Sheet 18 has similar portions (not shown). Sheet 16 is joined to base 22 along its near side joint portion 42; and sheet 18 is also joined to base 22 along its far side joint portion 44. As shown in FIG. 3, base 22 has a near side surface 46 for connection to the near side joint portion 42. Base 22 also has a far side surface 48 for connection to the far side joint portion 44. Instead of two separate sheets a single sheet folded at the midpoint and sealed along the edges can provide the three sided pouch before juncture with the upper portion 14.

Figure 5:
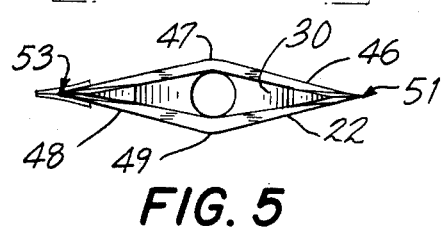
FIG. 5 is a plan view along line 5—5 of FIG. 3.

Surfaces 46 and 48 are contoured so that together they present a "diamond-shaped" appearance in the plan view of FIG. 5. Apices 47 and 49 preferably are radiused or are at a large angle. Thus in traversing each side, 46 or 48, from end 51 to end 53, there is no abrupt discontinuity, but rather a gradual transition. This results in a leak-free seal at manufacture which is maintained once the package is filled and delivered to the customer. Refer to the discussion hereinafter concerning FIG. 19. This describes how the feathering of the ends 51 and 53 further enhances the sealing between the pliable sheets and the base portion surfaces. The above discussion is illustrative and applies to the various embodiments of the upper portion to be described hereinafter.

In the six inch by nine and a half inch prototype of container 10, as mentioned previously, the width of each of the joint portions 36, 38 and 40 is about one quarter of an inch. Also, the stem 26 has about a one quarter of an inch outside diameter. Joint portions 36, 38 and 40 of sheet 16 and the corresponding joint portions (not shown) of sheet 18 are respectively joined together by using a heat seal, or like means, or by using an adhesive. Joint portions 42, 44 are respectively joined to surfaces 46, 48 by using a heat seal, or like means, or by using an adhesive.

Figure 8:
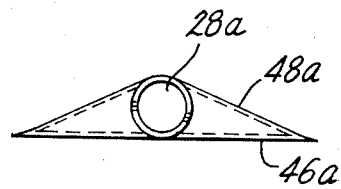
FIG. 8 is a plan view along the line 8—8 of FIG. 7.
Figure 7:
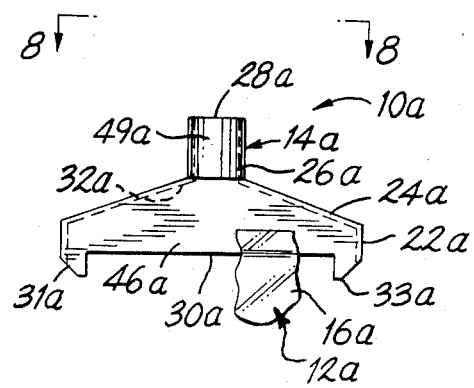
FIG. 7 is an elevation view of an upper portion of a second embodiment of the container.

As shown in FIGS. 7 and 8, a second embodiment of the invention is container 10a, which has an upper portion 14a. Parts of container 10a have the same numerals as corresponding parts of container 10, but with a subscript "a" added thereto. Upper portion 14a has a base portion 22a, a tapered portion 24a, and a stem portion 26a, which has a top opening 28a. Base 22a has a bottom opening 30a. Upper portion 14a also has a passageway 32a, which connects bottom opening 30a to top opening 28a. Base 22a also has a near side surface 46a and a far side surface 48a. The joint portions 42a, 44a of sheets 16a, 18a are respectively joined to surfaces 46a, 48a. Base 22a also has cantilever portions 31a, 33a for ease of manufacture of container 10a.

Figure 18:
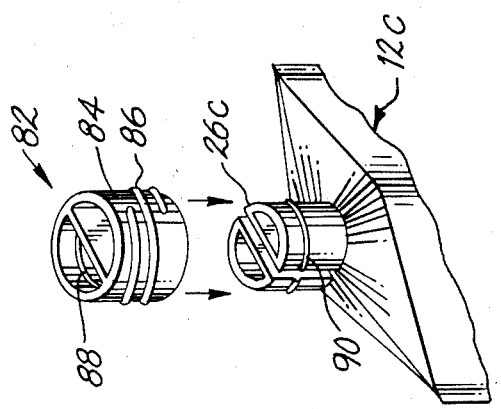
FIG. 18 is a perspective view of an upper portion of a fifth embodiment of the container.

With this construction, two containers 10a can be nested together, in flat-to-flat arrangement, and joined together by a third member as explained hereafter, and as shown in FIG. 18, so that such two-container assembly can be used for holding two separate contents and for mixing parts of the two contents upon dispensing the contents. This is particularly suited to containing epoxy glue contents.

Stem 26a has an outer surface 49a, which is substantially tangent to a plane extending through surface 46a.

As shown in FIGS. 9, 10, 11 and 12, a third embodiment of the invention is container 10b, which has an upper portion 14b. Parts of container 10b have the same numerals as corresponding parts of container 10, but with a subscript "b" added thereto. Upper portion 14b has a base portion 22b, a tapered portion 24b, and a stem portion 26b, which has a top opening 28b. Base 22b has a bottom opening 30b. Upper portion 14b also has a passageway 32b, which connects bottom opening, in a similar fashion such as 30a in FIGS. 7-8, to top opening 28b. Base 22b also has a near side surface 46b and a far side surface 48b. Base 22b also has cantilever portions 31b, 33b.

Figure 14:
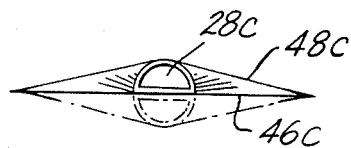
FIG. 14 is a plan view along the line 14—14 of FIG. 13.
Figure 13:
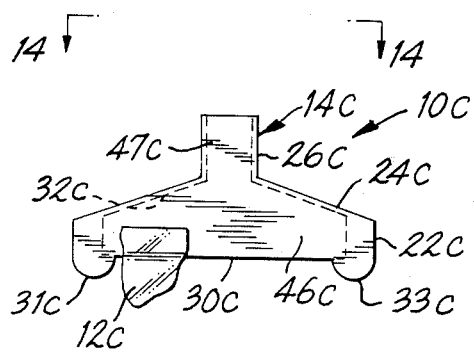
FIG. 13 is an elevation view of an upper portion of a fourth embodiment of the container.
Figure 10:
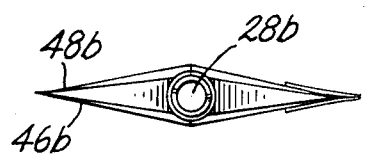
FIG. 10 is a plan view along the line 10—10 of FIG. 9.
Figures 9, 12:
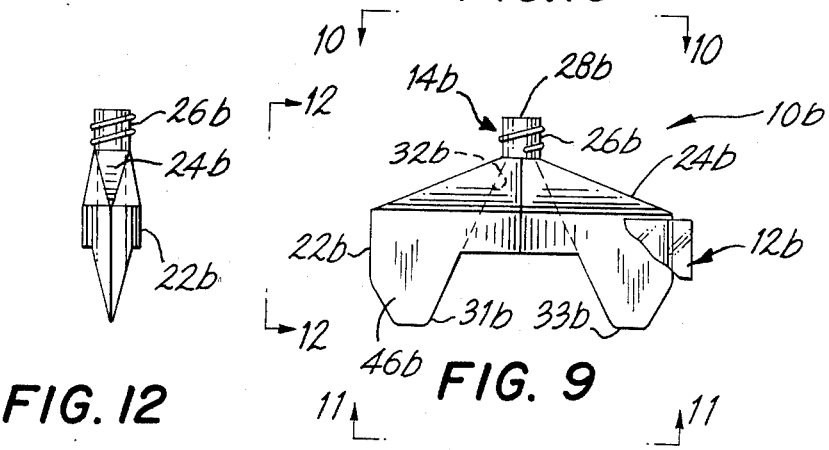
FIG. 9 is an elevation view of an upper portion of a third embodiment of the container.
FIG. 12 is an elevational view along the line 12—12 of FIG. 9.
Figure 11:
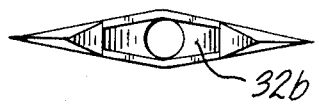
FIG. 11 is a plan view along the line 11—11 of FIG. 9.

As shown in FIGS. 13 and 14, a fourth embodiment of the invention is container 10c, which has an upper portion 14c. Parts of container 10c have the same numerals as corresponding parts of container 10, but with a subscript "c" added thereto.

Upper portion 14c has a base portion 22c, a tapered portion 24c, and a stem portion 26c, which has a top opening 28c. Base 22c has a bottom opening 30c. Upper portion 14c also has a passageway 32c, which connects bottom opening 30c to top opening 28c. Base 22c also has a near side surface 46c and a far side surface 48c. Base 22c also has cantilever-portions 31c, 33c. Stem 26c has a flat surface portion 47c, which is substantially coplanar with near side surface 46c.

Figure 15:
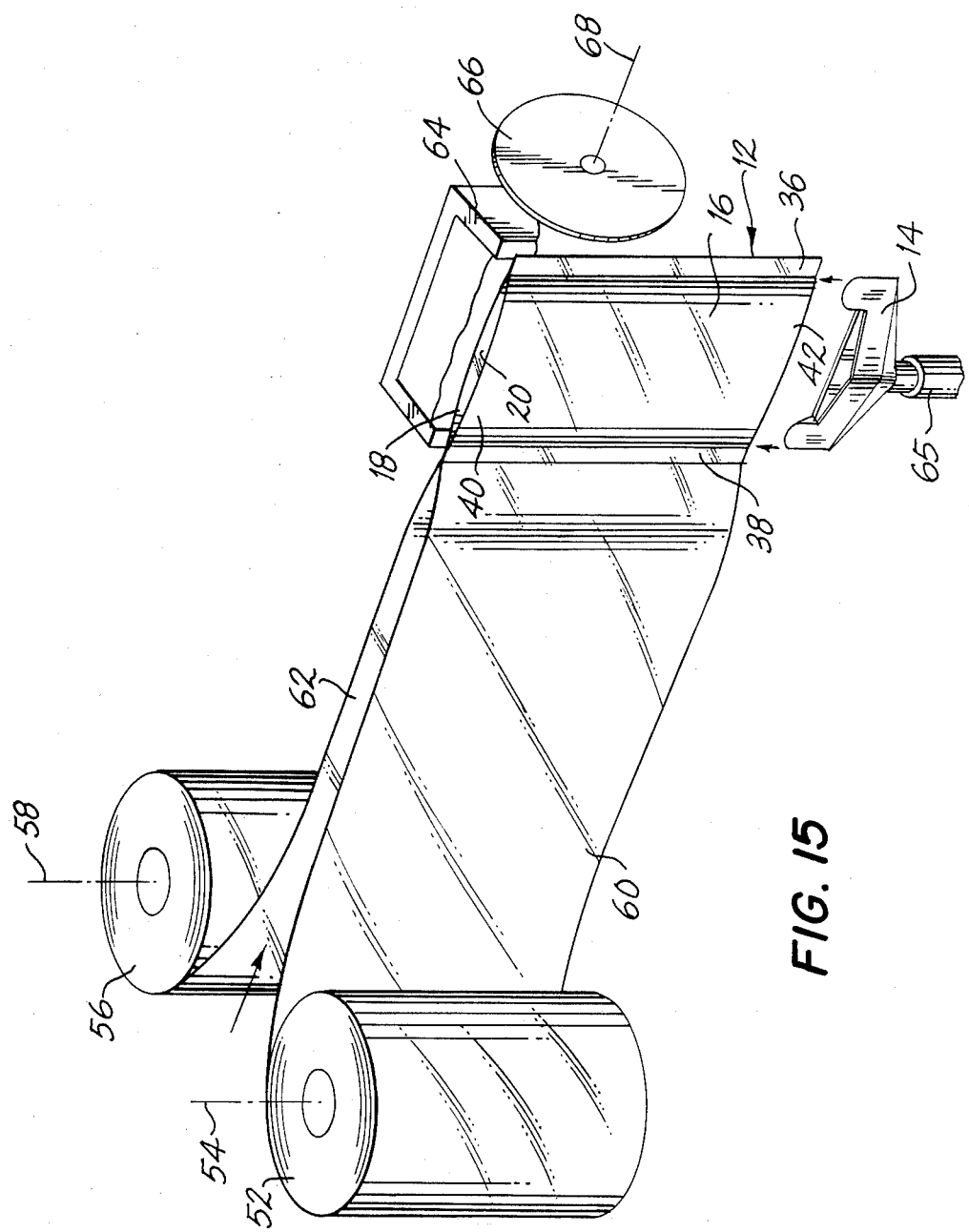
FIG. 15 is a perspective view of a first embodiment of an apparatus of manufacture of the container of the present invention.

FIG. 15 shows a first, preferred apparatus 50 for manufacture of container 10. Apparatus 50 has a near side roller 52 with an axis 54, and a far side roller 56 with an axis 58. Roller 52 supports and feeds a near side strip 60. Roller 54 supports and feeds a far side strip 62. Strips 60, 62 are guided along a working plane. A conventional heat seal presser 64 is provided to heat seal joint portions 36, 38 to corresponding portions of sheet 18 and to heat seal portions 42, 44 to portion 14.

A conventional bar or rotary slicer unit 66 with an axis 68 is provided to cut the strips 60, 62 at the joint portions 36, 38 to form individual pouch or container units 10. Container insert 14 is a molded piece, which is inserted automatically, between sheets 16, 18 in cavity 20 before heat sealing. Units of container 10 are made in an upside-down position in this process of manufacture, so that the open, upper end of cavity 20 at portion 40 can be filled with the container contents after the heat sealing at portions 36, 38, 42 is concluded. This open, upper end can then be sealed.

In an alternate process, strips 60, 62 are not cut after heat sealing, and the open end portion 40 is not heat sealed. Instead, the continuous series of attached pouches 10 are shipped to a vendor, who then fills the series of pouches 10, and heat seals together the portion 40 of sheet 16 to the corresponding portion of sheet 18. Presser 64 can be replaced by other well-known heat seal devices, in the process. An inserting device 65 is also provided for automatically inserting insert 14 into pouch 12.

FIG. 16 shows a second apparatus 68 for the manufacture of units of container 10. A series of self-aligning, upper portions or inserts 14 are provided. Inserts 14 are arranged as a molded cartridge 70, which contains a series or multiples of inserts 14, for ease of manufacture and for increased production speed and efficiency. In this process, the cartridge 70 is inserted into a series of pouches 72, which are a series of attached sheets 16, 18, that are heat sealed at joint portions 36 and 38 only. Strips or foils 69, 71 are fed into apparatus 68, along a working plane.

FIG. 17 shows an elevation view of cartridge 70, which corresponds somewhat to the elevation view of the single insert 14 in FIG. 3. Cartridge 70 includes a plurality, or series of inserts 14, which are shown in the elevation view of FIG. 17. Apparatus 68 includes two endless belts 73, 75, two tension rollers 74, 76 with respective axis 86, 88.

In this process, inserts 14d are pushed into position into pouches or lower portions 12d. Pouches 12d are side sealed before or after the inserts 14d are positioned. After inserts 14d are positioned into pouches 12d, then each insert 14d is sealed to its pouch 12d. The sealing operation is a heat seal operation. In the alternate, an induction heat seal, an ultrasonic seal, an adhesive seal, or a resistance fit without a heat seal, can be used.

Where the pouches 12d with the pre-assembled inserts 14d are pre-manufactured, and sold in empty form as a dispensing pouch, the vendor using secondary equipment then fills and seals the pouches 12. A recloseable, dispensing pouch 12d, which is not a tube, is provided by the above-mentioned process.

Insert 14d, in FIG. 17, also has a base 22d, a tapered portion 24d, a stem portion 26d and an opening 28d. Insert 14d also has a bottom opening 30d, a passageway 32d, near surface 46d, far surface 48d, and cantilever portions 31d and 33d.

In making the recloseable, dispensing pouch 12a, an insert 14a, as shown in FIGS. 7 and 8, is used. Insert 14a has one flat side 46a, and a full circle type of opening 28a. In the alternate arrangement of pouch 12c, an insert 14c, as shown in FIGS. 13 and 14, is used. Insert 14c one flat side 46c, and a one-half round opening 28c.

In FIG. 18, using container 12c, a dual chamber container system 82 is made using two containers 10c in a flat-to-flat arrangement, as shown in FIG. 18. System 82 has a common ring or lock device 84. Ring 84 has a thread 86 for connection to a cap (not shown). Ring 84 has a groove 88 for snap-fit over a protrusion 90 on neck 26c. Groove 86 receives protrusion 88 after assembly thereof.

In the alternate arrangement of pouch 12b, an insert 14b, as shown in FIGS. 9-12, is used. Insert 14b is a one-piece unit, which has beveled sides. Thus, inserts 14, 14a, 14b, 14c, all fit into their respective pouches 12, 12a, 12b, 12c.

The sealable, dispensing unit 14 can be sealed into the pouch 12 after pouch 12 is filled. In the alternative, the pre-manufactured pouch 12, with its dispensing insert 4 in place, can have the bottom portion open and can be sealed later, after filling.

In the process as shown in FIG. 15, the self-aligning insert 14 slips into position within pouch 12 and is sealed in place. In this process, the filling is done from the top side, after the bottom and sides of the pouch 12 are sealed.

In the process as shown in FIGS. 16 and 17, the injection-molded, orifice cartridge 70 is added to the top of pouch 12d, after pouch 12d is filled. In the alternative, pouch 12d can be pre-manufactured with the bottom left open for later filling.

Figure 4:
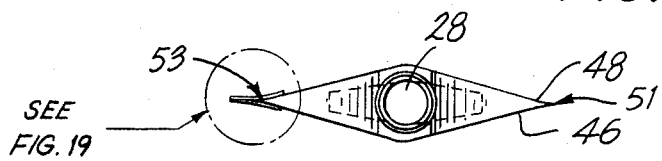
FIG. 4 is a plan view along line 4—4 of FIG. 3.
Figure 19:
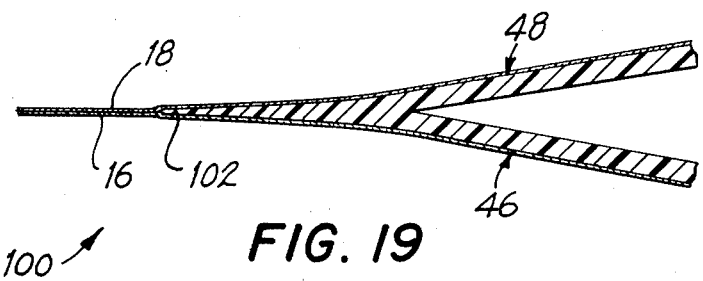
FIG. 19 is a plan view similar to FIG. 11, but magnified to reveal the interface at the ends of the upper portion with the pliable sheet members.

FIG. 19 is a magnified view of the identified portion of FIG. 4. The embodiment of FIG. 4 is illustrative and of course the following discussion pertains to the other disclosed embodiments as well.

Figure 20:
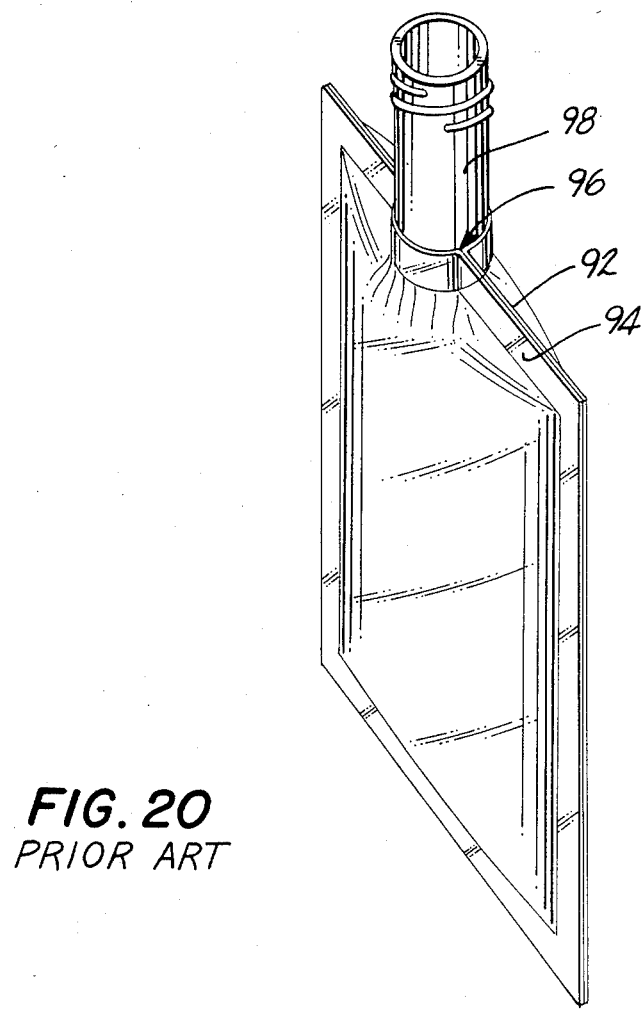
FIG. 20 is a perspective view of a prior art pouch with dispensing spout.

The magnified view demonstrates one of the more significant advantages of the present invention. As noted above in the background section, the drawback of one prior art type pouch with dispensing orifice, see FIG. 20, is the practical difficulty of effecting an adequate seal between the pliable sides 92 and 94 at the point 96 where the dispensing tube 98 interfaces with the seam to be formed. The abrupt change in direction, essentially 90°, which occurs at the juncture of the perimeter surface of the tube 98 with the pliable sides 92 and 94 results in a high rejection rate, a relatively slow manufacturing process and continuing failure of the filled pouches especially in the vicinity of this juncture. Further, it is not an appealing package to promote in the homeowner market.

The present invention by contrast employs a non-pliable, upper portion, 14. As described above, this includes a base, 22, whose respective juncture surfaces, 46 and 48, are gradually sloping or straight and do not include any abrupt angular discontinuities from end to end. The resulting seals with the complimenting pliable sheets 16 and 18 are predictably leak free at manufacture and remain so after the container is filled and delivered.

As can be seen from FIG. 19, the present invention ensures the effective seal at the side ends, for example, 100, of the pouch by utilizing an upper portion whose juncture sides 46 and 48 feather down to a film thick layer 102 which in fact becomes a layer in a laminate formed when sheets 16 and 18 are sealed to surfaces 46 and 48. Again this discussion as to FIG. 4 is illustrative and pertains as well to the various other embodiments described.

It should be understood that the invention is not limited to the exact details of construction shown and described herein for obvious modifications will occur to persons skilled in the art.

For example, instead of heat sealing joint portions 36, 38, 40 of sheet 16 to corresponding portions of sheet 18, a seal insert would be provided for inserting between corresponding, adjacent joint portions. The seal insert would have an outside overlap, which pinches the joint portions and seals together the adjacent overlapped joint portions.

What is claimed is:

1. A collapsible container comprising:

a first, pliable member and a second, non-pliable member, wherein said first pliable member includes a first pliable sheet and a second pliable sheet, said first pliable sheet and said second pliable sheet having a respective left edge joint portions, right edge joint portions and bottom edge joint portions which are respectively joined together to form a pouch with a variable volume cavity therebetween for containing dispensible material, said caivty having an open end for connecting to said second, non-pliable member, said second non-pliable member including a base portion having opposite surfaces including a near side surface and a far side surface, said first pliable sheet and said second pliable sheet having respective, inwardly facing, near and far top edge joint portions, said near and far side surfaces having continuous respective contours feathering down to meet at the two ends of said base portion to form a film thick endings, said respectie contours without angular discontinuities, said near and far side surfaces, including the film thick endings, disposed between and sealingly connected to the inwardly facing, near and far top edge joint portions of said first and second pliable sheets, whereby the connection thereto of said first pliable sheet and said second pliable sheet is substantially leak free, said second, non-pliable member further including a tapered portion connecting to the base portion, and a stem portion connecting to the tapered portion, and wherein said stem portion has an opening for dispensing the contents of the container, and said base portion has an opening for receiving the contents from the cavity, and said second non-pliable member has a passageway connecting the stem opening to the base opening for dispensing the contents, and wherein said near side surface of the second non-pliable member and the surface of said first pliable sheet sealingly connected thereto are substantially disposed in a common plane, whereby two containers can be nested together in a flat-to-flat arrangement for simultaneously dispensing two different container contents.

2. The container of claim 1, wherein said stem portion has a thread for connection to a cap, and said base portion has a pair of cantilever portions for ease of assembly of said second non-pliable member to said first pliable member.

3. The container of claim 1 wherein said stem outer surface is substantially circular and includes a portion which is disposed substantially tangent to said common plane.

4. A dispensing system including two identical containers, each container being constructed in accordance with claim 3 and including a ring member for fixedly connecting the two containers at their stem portions.

5. The container of claim 1, wherein said stem outer surface includes a portion which is substantially flat and is coplanar with said common plane.

6. A dispensing system including two identical containers, each container being constructed in accordance with claim 5, and including a ring member for fixedly connecting the two containers at their stem portions.

* * * * *